(12) United States Patent
Yoshikawa et al.

(10) Patent No.: US 8,199,067 B2
(45) Date of Patent: Jun. 12, 2012

(54) DISPLAY APPARATUS AND A CONTROL METHOD THEREFOR

(75) Inventors: Tomoyasu Yoshikawa, Kawasaki (JP); Tetsu Fukuda, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 894 days.

(21) Appl. No.: 12/262,635

(22) Filed: Oct. 31, 2008

(65) Prior Publication Data

US 2009/0128447 A1    May 21, 2009

(30) Foreign Application Priority Data

Nov. 19, 2007   (JP) .................................. 2007-299835

(51) Int. Cl.
  *G09G 5/00*   (2006.01)
(52) U.S. Cl. ......................................................... 345/1.1
(58) Field of Classification Search .................. 345/1.1, 345/1.3, 532; 348/588
  See application file for complete search history.

(56) References Cited

U.S. PATENT DOCUMENTS

| | | | |
|---|---|---|---|
| 7,239,310 B2 | 7/2007 | Iinuma | |
| 7,561,116 B2 * | 7/2009 | Westerinen et al. | 345/1.1 |
| 8,049,678 B2 * | 11/2011 | Lee et al. | 345/1.1 |

FOREIGN PATENT DOCUMENTS

| | | | |
|---|---|---|---|
| JP | 11-231850 | | 8/1999 |
| JP | 2002-073497 | | 3/2002 |
| JP | 2006-330738 | * | 12/2006 |
| JP | 2007-053518 | | 3/2007 |

OTHER PUBLICATIONS

English translation by human translator of JP2002-073497, submitted with Information Disclosure Statement filed Oct. 31, 2008.
English translation by human translator of JP2007-053518, submitted with Information Disclosure Statement filed Oct. 31, 2008.

* cited by examiner

*Primary Examiner* — Abbas Abdulselam
(74) *Attorney, Agent, or Firm* — Cowan, Liebowitz & Latman, P.C.

(57) ABSTRACT

A control unit 201, after sending information that should be displayed on a sub-display to a sub-control unit 301, turns power to itself off and enters a standby state. When returning to a power-on state from standby state, first a sub-control unit is started up and a power-on request is made to a main display unit 201, then, in the interval before completion of start-up of the main control unit 201, information received from the main control unit 201 when it entered standby state is caused to be displayed on the sub-display.

12 Claims, 9 Drawing Sheets

FIG. 8

| 1001 | 1003 | 1005 | 1007 |
|---|---|---|---|
| 000001 | LAST Ch | 88 | 1 |
| 000002 | LAST Vol | 20 | 1 |
| ... | ... | ... | ... |
| 770909 | Ch77 (10:00 ~) | ZZZ | 0 |
| 880001 | Ch88 (0:00 ~) | AAaa | 2 |
| 880002 | Ch88 (1:00 ~) | AAbb | 2 |

FIG. 9

| 1201 | 1202 | 1203 | 1205 | 1207 | 1209 | 1211 |
|---|---|---|---|---|---|---|
| 000001 | RECORD | APRIL 26 (THU) | 21:00 | 21:54 | 88ch | AAA SPECIAL |
| 000002 | RECORD | APRIL 30 (MON) | 0:15 | 01:50 | 115ch | SERIES XYZ |
| 000003 | VIEW | MAY 2 (WED) | 19:00 | 20:54 | 102ch | SCENERY QWERT |
| ... | | | | | | |

DISPLAY APPARATUS AND A CONTROL METHOD THEREFOR

BACKGROUND OF THE INVENTION

1. Field of the Invention

The present invention relates to a display apparatus and a control method therefor; more particularly, to a display apparatus possessing multiple display units and a control method therefor.

2. Description of the Related Art

In recent years, with the spread of digital broadcasting and the Internet, electronic apparatuses possessing functionality capable of displaying information obtained through such medium have been widely adopted.

For example, Japanese Patent Laid-Open No. 2007-053518 discloses a television having, in addition to a main display that displays broadcast programs, a sub-display that displays program information, and displaying on the sub-display, when the television is in a stand-by state, program information which conforms to information related to a viewer's preferences.

Meanwhile, current environmental problems have created a strong demand for reductions in the energy consumption of electronic devices. For example, Japanese Patent Laid-Open No. H11-231850 discloses a method whereby, when a display apparatus having a plurality of CPU's enters a standby state, a sub-CPU controls display of a screensaver while a main CPU is entered a suspend state, thereby suppressing energy consumption when in the standby state.

In the television apparatus disclosed in Japanese Patent Laid-Open No. 2007-053518, display control of both the main display and the sub-display is performed by the same control unit. Therefore, even when in the standby state and only the sub-display is displaying information, reduction in energy consumption stops with the main display.

From the perspective of reducing energy consumption while in the standby state, it may be thought effective to use multiple control units and use a sub-control unit to perform control of the sub-display, like the method described in Japanese Patent Laid-Open No. H11-231850. However, if, while in the standby state, the information to be displayed exists in the main control unit, even if there are multiple control units, the main control unit cannot enter suspend state and no effective difference in energy consumption is achieved over the case of having a single control unit.

This problem may be solved if the sub-control unit could be provided the same information that the main control unit has. However, providing the same information to multiple control units in order to carry out display while in the standby state is inefficient because it requires an increase in memory usage, and redundant information processing.

SUMMARY OF THE INVENTION

The present invention has been made in view of the above-described problems with the current technology and provides a simple configuration which allows reductions in energy consumption in a display apparatus possessing multiple display units during in the standby state.

According to an aspect of the present invention, there is provided a display apparatus having a first display unit, a second display unit, a first control unit which controls the first display unit, and a second control unit which controls the second display unit, wherein: the first control unit, in response to an instruction to the display apparatus to enter a standby state from a power-on state, after sending predetermined information that should be displayed on the second display unit to the second control unit, powers itself off, and the second control unit stores the predetermined information that should be displayed on the second display unit, which it received from the first control unit, in a storage unit, and the second control unit, in response to an instruction to the display apparatus to enter the power-on state from the standby state, outputs a power-on request to the first control unit, and reads out the predetermined information that should be displayed on the second display unit from the storage unit and causes the predetermined information to be displayed on the second display unit.

According to another aspect of the present invention, there is provided a display apparatus having a first display unit, a second display unit, a first control unit which controls first display unit, and a second control unit which controls the second display unit, wherein: the first control unit, in response to an instruction to the display apparatus to enter a standby state from a power-on state, after storing predetermined information that should be displayed on the second display unit to a storage unit, powers itself off; the second control unit, in response to an instruction to the display apparatus to enter the power-on state from the standby state, sends a power-on request to the first control unit; in response to the power-on request, the first control unit, before executing start-up processing, reads out the predetermined information that should be displayed on the second display unit from the storage unit, and sends it to the second control unit; and the second control unit causes the predetermined information that should be displayed on the second display unit, which was received from the first control unit, to be displayed on the second display unit.

According to further aspect of the present invention, there is provided a display apparatus having a first display unit, a second display unit, a first control unit which controls the first display unit, and a second control unit which controls the second display unit, wherein: in a standby state in which the first control unit is in a power-off state and the second control unit is in a power-on state, when the second control unit receives a reservation information confirmation request, the second control unit, without starting up the first control unit, reads out reservation information stored in advance in a storage unit, which is accessible from the second control unit in the standby state.

According to yet further aspect of the present invention, there is provided a control method of a display apparatus having a first display unit, a second display unit, a first control unit which controls the first display unit, a second control unit which controls the second display unit, the method comprising: a step in which the first control unit, in response to an instruction to the display apparatus to enter a standby state from a power-on state, sending predetermined information that should be displayed on the second display unit to a second control unit, and then powering itself off, and a step in which the second control unit saving the predetermined information that should be displayed on the second display unit, which was received from the first control unit, to a storage unit, and a step in which in response to an instruction to enter the power-on state from the standby state, the second control unit sending a power-on request to the first control unit, reading out the predetermined information that should be displayed on the second display unit, and causing the predetermined information to be displayed on the second display unit.

According to another aspect of the present invention, there is provided a control method of a display apparatus having a first display unit, a second display unit, a first control unit which controls the first display unit, a second control unit which controls the second display unit, the method comprising: a step in which the first control unit, in response to an instruction to the display apparatus to enter a standby state from a power-on state, saving predetermined information that should be displayed on the second display unit in a storage unit, then powering itself off, and a step in which the second control unit, in response to an instruction to the display apparatus to enter the power-on state from the standby state, sending a power-on request to the first control unit, and a step in which the first control unit, in response to the power-on request, before start-up processing, reading out the predetermined information that should be displayed on the second display unit from the storage unit and sending the predetermined information to the second control unit, and a step in which the second control unit receiving from the first control unit the predetermined information that should be displayed on the second display unit and causing the predetermined information to be displayed on the second display unit.

According to further aspect of the present invention, there is provided a control method of a display apparatus having a first display unit, a second display unit, a first control unit which controls the first display unit, a second control unit which controls the second display unit, the method comprising: a step in which in a standby state in which the first control unit is in power-off state and the second control unit is in power-on state, when the second control unit receives a reservation information confirmation request, the second control unit, without starting up the first control unit, reading out reservation information stored in advance in a storage unit accessible by the second control unit in the standby state, and a step in which the second control unit causing the reservation information to be displayed on the second display unit.

Further features of the present invention will become apparent from the following description of exemplary embodiments with reference to the attached drawings.

BRIEF DESCRIPTION OF THE DRAWINGS

FIG. 8 depicts an instance of data held in shared memory 601 in a television receiver 100', according to the third embodiment of the present invention.

FIG. 9 depicts an instance of reservation information stored in a shared memory 601 in a television receiver 100', according to the fourth embodiment of the present invention.

DESCRIPTION OF THE EMBODIMENTS

Preferred and exemplary embodiments of the present invention will now be described in detail in accordance with the accompanying drawings.

Note that the explanation below is made using a television receiver as an instance of a display apparatus possessing multiple display units. However, the present invention is not limited to television receivers and it is optionally possible to apply it to other display apparatuses possessing multiple display units.

First Embodiment

Figure 1:
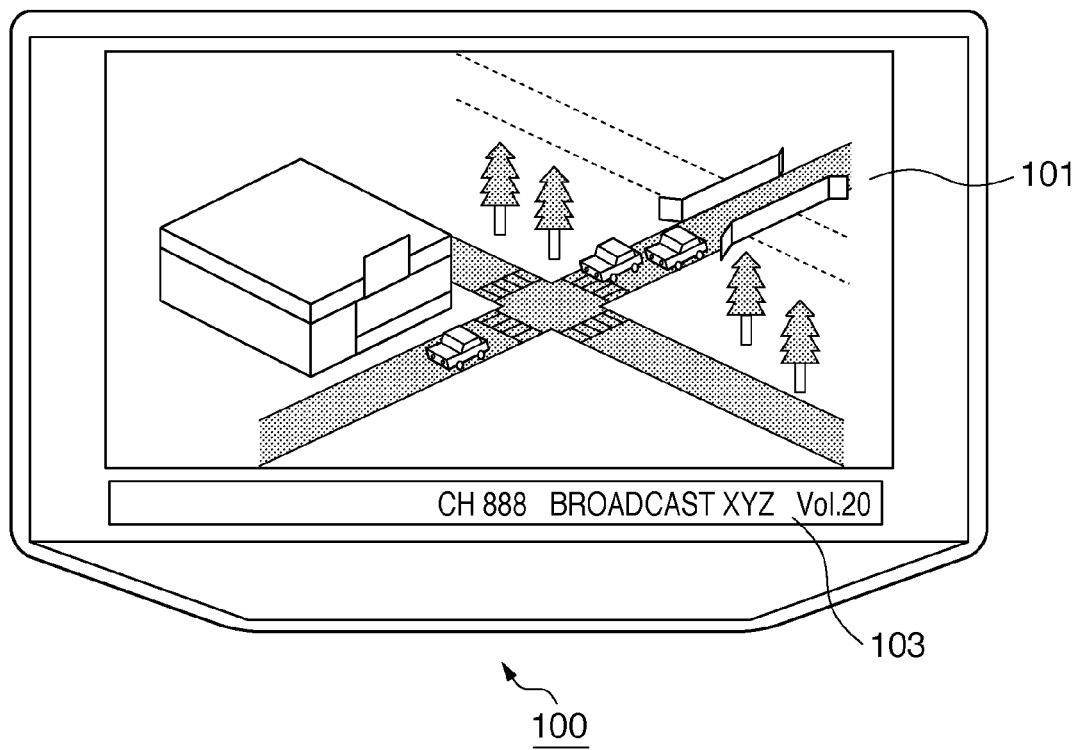
FIG. 1 depicts an external view of an instance of a television receiver 100 as viewed from the screen side, according to the first embodiment of the present invention.

FIG. 1 depicts an external view of an instance of a television receiver 100 as viewed from the screen side, according to the first embodiment of the present invention.

For multiple display units, the television receiver 100 of the present embodiment is equipped with a main display 101 and a sub-display 103. In the present embodiment it is possible to independently control power-on and power-off of the main display 101 and the sub-display 103 by using, respectively, a main control unit 201 and a sub-control unit 301, which will be explained later.

In the present embodiment, the display area of the sub-display 103 are smaller than that of the main display 101, and, instead of acting as a video image display substitute for the main display, the purpose of the sub-display is for display of auxiliary information such as text-based information.

The main display 101 displays the video image signal of received broadcast programs, the video image signal from HDD recorders and similar external devices. Further, the sub-display 103 is used to display text-based information such as the transmission source of the video image currently being displayed on the main display 101 (e.g., broadcasting company name, channel information, etc.), volume level, and information related to the program currently being displayed.

Figure 2:
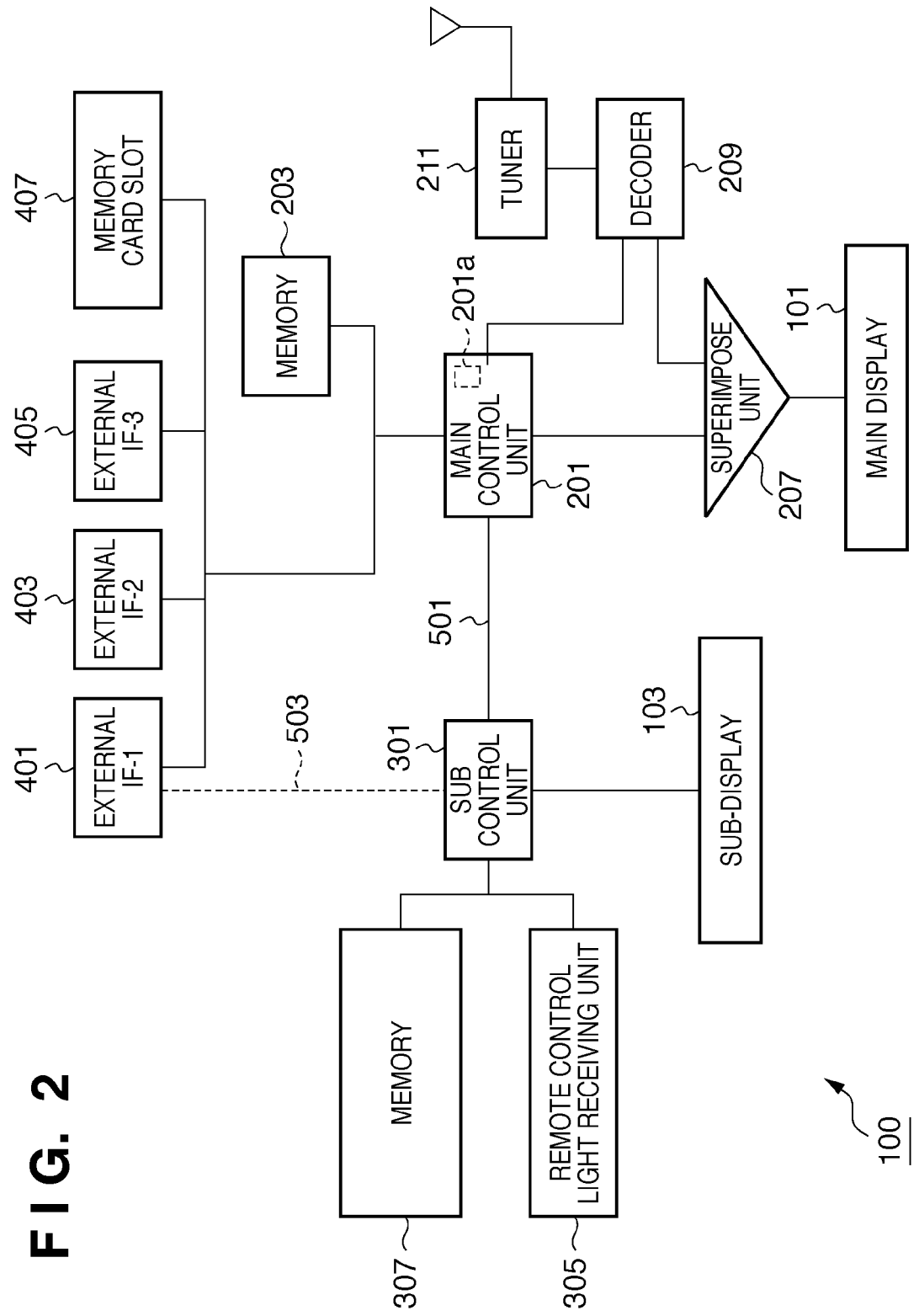
FIG. 2 is a block diagram which depicts an instance of functions of a television receiver 100, according to the first embodiment of the present invention.

FIG. 2 is a block diagram which depicts an instance of functions of a television receiver 100, according to the first embodiment of the present invention.

The main control unit 201 executes display control over the main display 101. Moreover, the main control unit 201 also executes a process to extract associated information, which is included in the broadcast signal received by the tuner 211, by a decoder 209 and to store the extracted associated information in a memory 203. The decoder 209 decodes the broadcast signal to generate video and audio signals. The main display 101 displays the video signal output from the decoder 209. The audio signal is output from speakers (not shown). A superimpose unit 207 superimposes GUI (Graphical User Interface) image, such as an on-screen-display and an EPG, output from the main control unit on the video signal.

The sub-control unit 301 executes display control over the sub-display 103. Moreover, the data displayed on the sub-display 103 is stored in the memory 307. At times when the main control unit 201 is not operating, such as while in the standby state, the sub-control unit 301 displays the data stored in the memory 307 on the sub-display 103.

Using a remote control (not shown), a user can operate the television receiver 100 and provide variety types of instructions to it. A remote control signal, for example an infrared signal, output from the remote control is received by the remote control light receiving unit 305; the received remote control signal is then passed from the sub-control unit 301, through a communication line 501, to the main control unit 201. The main control unit 201 then executes control in accordance with the received remote control signal.

A television receiver 100 comprises external device interfaces 401, 403 as well as 405 in order to connect to external devices such as video recorders.

For example, when the external device interfaces 401, 403, and 405 are of a type those support control signals for controlling a television receiver 100 from external devices, such control signals are sent through the communication line 503 to the sub-control unit 301. Examples of this type of interface include that conforms to the HDMI (High-Definition Multimedia Interface) standard. The HDMI standard supports the CEC (Consumer Electronics Control) as a standard for control signals.

FIG. 1 depicts an instance of the display state before system shutdown of the television receiver 100 of the present embodiment. In FIG. 1, a broadcast program video image is displayed on the main display 101, and on the sub-display 103 is displayed transmission source information for the broadcast program displayed on the main display 101 (e.g., channel number, broadcast company name, etc.) as well as volume level.

Figure 3:
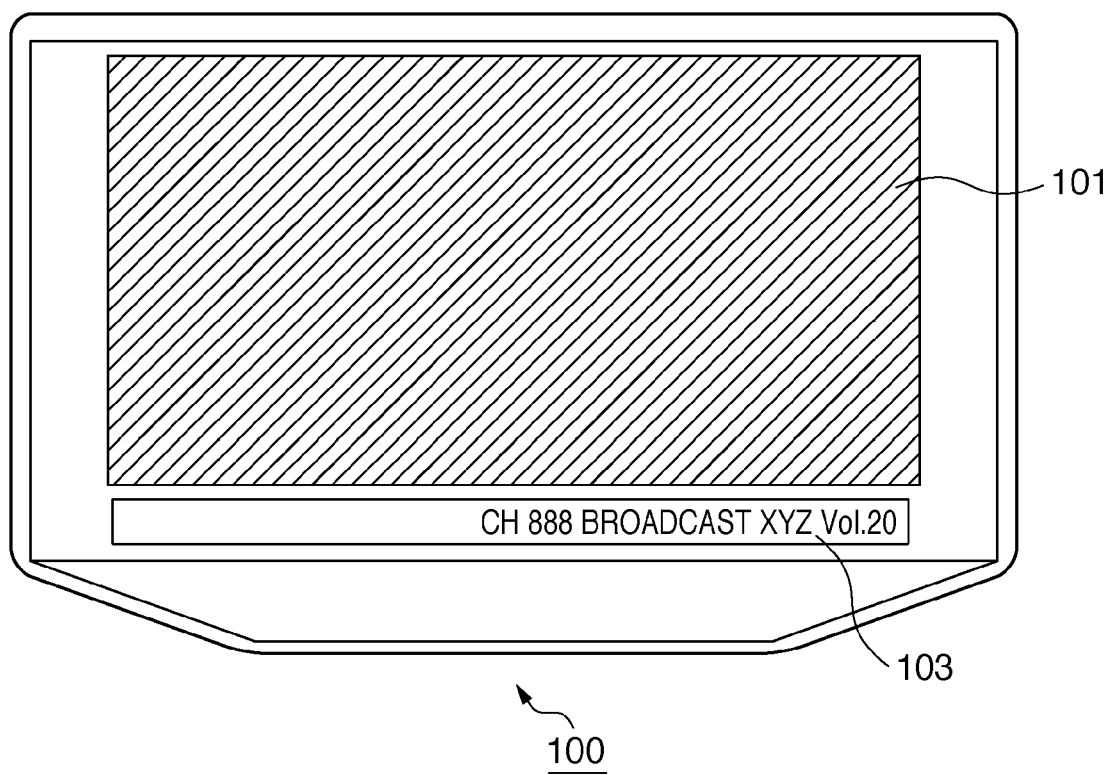
FIG. 3 depicts an instance of the display state immediately after start-up of a television receiver 100 according to the first embodiment of the present invention.

FIG. 3 depicts an instance of the display state immediately after system startup of the television receiver 100 of the present embodiment.

The state displayed in FIG. 3 corresponds to a state immediately after receiving a power-on instruction subsequently to receiving a power-off instruction from a user during the condition shown FIG. 1.

Startups of the main control unit 201 as well as the decoder 209, which reconstructs video image signals from broadcast waves, are time-consuming. Because of this, it is difficult to display video images from external devices and broadcast programs on the main display 101 immediately after power-on.

Here, when a power-on instruction is received, the television receiver 100 of the present embodiment uses the sub-control unit 301, start-up of which requires a short amount of time, and immediately carries out information display using the sub-display 103. More concretely, until the main control unit 201 and the decoder 209 have completed start-up and the like and video images can be displayed on the main display 101, the television receiver 100 of the present embodiment displays, on the sub-display 103, information regarding the video image to be displayed.

When the video image to be displayed is from a broadcast program, information regarding the video image to be displayed may be, for example, transmission source (channel number, broadcast company name, etc.) and volume level. Further, when the video image to be displayed is from an external device, information regarding the particular interface to which the external device is connected (interface names and numbers such as "HDMI Input", "External Input 1", etc.) and volume level may be used as information regarding the video image to be displayed.

In this manner, by conveying to a user information regarding the video image to be displayed in the interval after a power-on instruction and before a video image can actually be displayed, a user can confirm that the power-on instruction is certainly received by the television receiver 100. Further, a user can also immediately provide an instruction for changing channel and volume level even before a video image is displayed, if desired.

Figure 4:
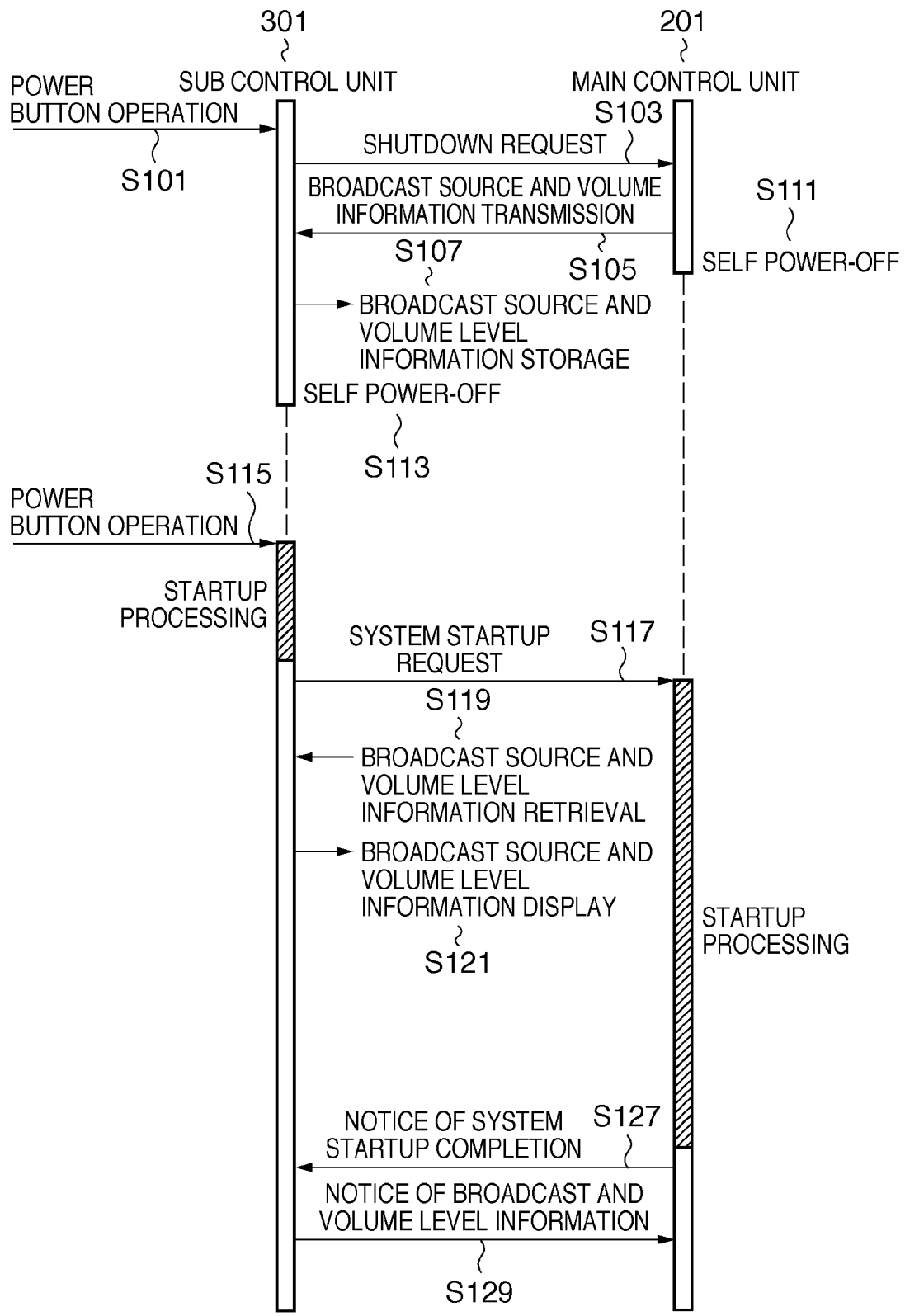
FIG. 4 is a timing chart which explains processing performed by the main control unit 201 and sub-control unit 301 of a television receiver 100 according to the first embodiment of the present invention as state transitions are made from power-on to power-off and to power-on again.

FIG. 4 is a timing chart which explains processing performed by the main control unit 201 and sub-control unit 301 of a television receiver 100 according to the first embodiment of the present invention as state transitions are made from power-on, to power-off and to power-on again.

At S101, after a user presses the power button of a remote control (not shown), the sub-control unit 301 receives the power control instruction via the remote control light receiving unit 305. Because the current state is power-on, the power control instruction becomes a power-off request.

In S103, the sub-control unit 301, which receives the power-off request, sends a shutdown request to the main control unit 201.

When the main control unit 201 receives the shutdown request, it sends information regarding the video image being displayed at that point in time on the main display 101 to the sub-control unit 301 (S105). Here, if the video image being displayed is related to a broadcast program, information regarding the video image being displayed may be transmission source information (channel number, broadcast company name) and volume level. Further, when the video image displayed on the main display 101 is from an external device, which one of the interfaces through which video image displayed on the main display 101 is supplied and the volume level is sent to the sub-control unit 301 as broadcast source information.

Then, while taking no action on units controlled by the sub-control unit 301, the main control unit 201 executes power-off processing related to components which are to be powered-off in the standby state, such as the main display 101 and decoder 209, and finally completes actions by powering itself off (S111).

The sub-control unit 301 receives the items of information (assuming that the transmission source information and volume level), which is sent in S105 by the main control unit 201, and saves each of them in the memory 307 (S107). Then, the sub-control unit 301, after powering off its control target units including the sub-display 103, completes actions by powering itself off (S113).

At this point, the television receiver 100 has entered the standby state. In the standby state, energy consumption is reduced by placing in a power-on state the minimum required functional blocks for recognizing remote control power control instructions and for deciding whether or not it is necessary to execute scheduled processing.

In the standby state, a user presses the remote control power button (S115). Because the current state is power-off, the remote control light receiving unit 305 interprets the power control instruction as a power-on request. In response, the remote control light receiving unit 305 outputs a start-up signal which starts up the sub-control unit 301.

In response to the start-up signal, the sub-control unit 301 carries out start-up processing to begin supplying power to each of its control target units, including the sub-display 103. After start-up, the sub-control unit 301 sends a system start-up request to the main control unit 201 (S117). In response to the system start-up request, the main control unit 201, commences start-up processing including a process to begin supplying power to each of its control target units, including the main display 101, tuner 211, as well as the decoder 209.

After sending a system start-up request, the sub-control unit 301 reads out from the memory 307 the broadcast source and volume level information stored in S107 (S119). The sub-control unit 301 then causes this information to be displayed on the sub-display 103 (S121).

While waiting for notice of start-up completion from the main control unit 201, the sub-control unit 301 can accept instructions such as changes to channel, video image input source, volume level and the like, via the remote control light receiving unit 305.

Figure 5:
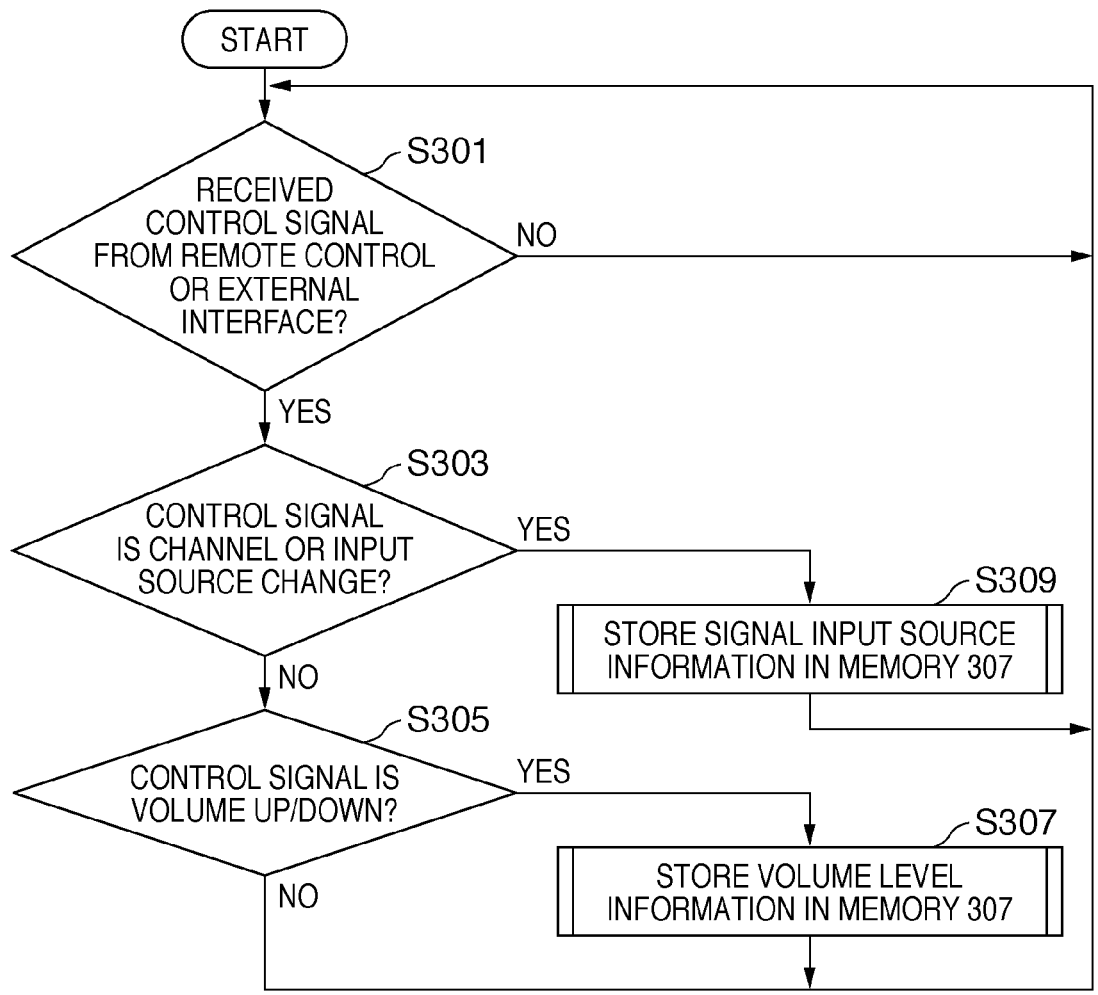
FIG. 5 is a flowchart which depicts processing performed by the sub-control unit 301 from the point at which a system start-up request is output to the point at which a system start-up completion notice is received, in a television receiver 100 according to the first embodiment of the present invention.

FIG. 5 is a flowchart which depicts processing performed by the sub-control unit 301 from the point at which a system start-up request is output to the point at which a system start-up completion notice is received.

In S301, the sub-control unit 301 detects whether or not a signal has been received from the remote control light receiving unit 305, or any of external device interfaces 401, 403 or 405. If it detects that a signal has been received, the sub-control unit 301 proceeds the processing to S303.

In S303, the sub-control unit 301 diverges processing based on whether or not the signal received in S301 is an instruction to change broadcast channel or an input source. That is, the sub-control unit 301 proceeds the processing to S309 if an instruction to change broadcast channel or input source is received, otherwise to S305.

In S305, the sub-control unit 301 diverges processing based on whether or not the signal received in S301 was an instruction to change volume level. If so, the sub-control unit 301 proceeds processing to S307, otherwise the sub-control unit returns processing to S301 and repeats signal receipt detection.

In S307, the sub-control unit 301 saves the changed volume value in the memory 307, then returns processing to S301 and carries out detection of the next received signal.

In S309, the sub-control unit 301 saves the changed broadcast source information (channel number or external device interface number after the change) to the memory 307, then returns processing to S301 and carries out detection of the next received signal.

In this manner, received instructions may be reflected in the display of the sub-display 103 and instructions to the main control unit 201. More concretely, it is possible to change the display of the channel number as well as broadcast company name (or interface name) when a channel (video image input source) change instruction is received and to change the volume level display when a volume level change instruction is received. In this way, it is possible to provide feedback to a user of the receipt of user operations. Then, the sub-control unit 301 saves, in the memory 307, changed broadcast source information and volume level information.

After the main control unit 201 has completed start-up processing, the main control unit 201 sends a system start-up completion notice to the sub-control unit 301 (S127).

When the sub-control unit 301 receives a system start-up completion notice, it reads out the broadcast source information and volume level information from the memory 307 and sends these to the main control unit 201 (S129). While waiting for the system start-up completion notice from the main control unit 201, if there was an instruction to change video image input source (channel or external device interface) or volume level, the changed broadcast source or volume level information is sent to the main control unit 201.

The main control unit 201 controls the tuner 211, the decoder 209 or the like using the broadcast source and volume level information received from the sub-control unit 301 and commences output of video image display and audio on the main display 101, using the same channel and volume level as those used when power-off was performed.

As explained above, the display apparatus of the present embodiment comprises a first display unit (main display 101) and a second display unit (sub-display 103) of smaller shape than the first display unit. Further, the display apparatus also comprises a first control unit (main control unit 201) which carries out control of the first display unit, and a second control unit (sub-control unit 301), which executes control over the second display unit. Then, in response to a power-off instruction, the first control unit sends notice of information that should be displayed at the next system start-up time (e.g., broadcast source and volume level information) to the second control unit and transitions into the standby state. The second control unit saves the received information that should be displayed at next system start-up time and transitions into the standby state.

When a power-on instruction is received in the standby state, first, the second control unit, whose start-up time is short, is started up and, in addition to commencing start-up of the first control unit, it causes the saved information to be displayed on the second display unit. Because of this, it is possible to offer users information through the second display unit, even before start-up of the first control unit has completed and while video image display is not yet possible on the first display unit.

Further, because it is possible for the first and second display units and the first and second control units to be in a power-off state when in the standby state, it is possible to reduce standby power consumption.

In the present embodiment, the information relating to the video image displayed on the first display unit when a power-off instruction is received by the television receiver has been explained as an example of the information that should be displayed at start-up on the second display unit. However, the information should be displayed at start-up time sent from the first control unit to the second control unit may include other information.

Second Embodiment

Next, a second embodiment of the present invention will be explained. Note that the display apparatus related to the present embodiment may have the same outer appearance and functional configuration as the television receiver 100 explained in the first embodiment and a redundant description will therefore be omitted.

Figure 6:
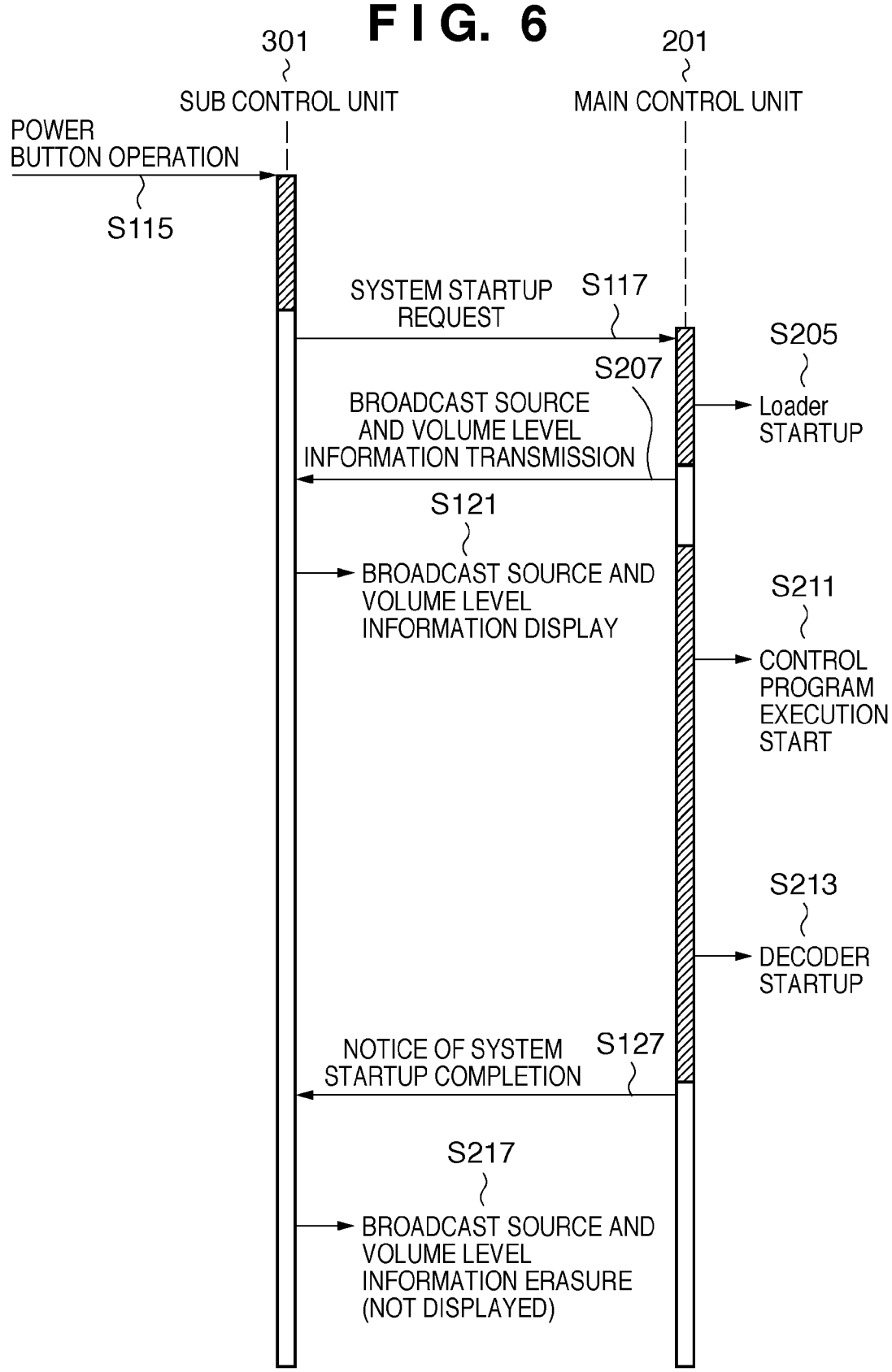
FIG. 6 is a timing chart which explains processing performed by the main control unit 201 and the sub-control unit 301 from the point power-off is performed to the point at which the power-on state is reached, in a television receiver 100 according to the second embodiment of the present invention.

FIG. 6 is a timing chart which explains processing performed by the main control unit 201 and the sub-control unit 301 from the point power-off is performed to the point at which the power-on state is reached, in a television receiver 100 according to the present embodiment. The same reference numerals are used in both FIGS. 4 and 6 to refer to the same processing and a redundant description will therefore be omitted.

However, distinct from the first embodiment, in the present embodiment, at power-off time the main control unit 201 does not send the sub-control unit 301 information that should be displayed at the next start-up time. Instead, in the present embodiment, the main control unit 201 stores the broadcast source and volume level in the memory 203. Further, in the present embodiment, after a fixed period of time following the transmission of a shutdown request, the sub-control unit 301 powers itself off.

In the standby state, a user presses the remote control power button (S115). Because the current state is power-off, the remote control light receiving unit 305 interprets the power control instruction as a power-on request. In this way, the remote control light receiving unit 305 outputs a start-up signal which causes the sub-control unit 301 to start up.

In response to the start-up signal, the sub-control unit 301 executes processing to begin supplying power to each of its control target units, including the sub-display 103. After start-up, the sub-control unit 301 sends a start-up request to the main control unit 201 (S117).

When the main control unit 201 receives the start-up request, the loader 201a of the main control unit 201 starts up (S205). The loader 201a is a so-called boot loader, a program stored in a non-volatile memory in the main control unit 201 (not depicted). The loader 201a starts up preceding the start-up processing of the main control unit 201; The loader 201a causes the main control unit 201 to execute a control program required for the main control unit 201 by transferring the control program from the memory 203 to the internal memory of the main control unit 201. By executing the control program and controlling each unit, the main control unit 201 realizes the functions of the television receiver 100.

The loader 201a retrieves the broadcast source and volume level information which should be displayed on the sub-display 103 from the memory 203, and sends it to the sub-control unit 301 (S207). After this, the loader 201a retrieves from the memory 203 a control program for the main control unit 201 to control the television receiver 100 and cause the main control unit 201 to execute the control program by transferring the control program to the main control unit (S211). Further, the loader 201a starts up the decoder 209 (S213).

The sub-control unit 301 saves in the memory 307 the broadcast source and volume level information received in S207 and also causes it to be displayed on the sub-display 103 (S121).

After the decoder 209 completes start-up, the main control unit 201 sends a start-up completion notice to the sub-control unit 301 (S127). In the present embodiment, when the sub-control unit 301 receives the start-up completion notice, it stops displaying broadcast source and volume level information on the sub-display 103 (S217).

According to the present embodiment, in response to a power-off instruction, the first control unit (main control unit 201) records information which should be displayed on the second display unit (sub-display 103) at next start-up time (e.g., broadcast source and volume level information) and transitions to the standby state.

When a power-on instruction is received in the standby state, the second control unit, the start-up time of which is short, starts up first and causes the first control unit to begin start-up. The boot loader, which operates first at start-up time of the first control unit, transfers stored information to the second control unit. The second control unit displays the transferred information on the second display unit. Because of this, it is possible to offer users information through the second display unit, even before start-up of the first control unit has completed and while video image display is not yet possible on the first display unit.

In this way, the present embodiment differs from the first embodiment essentially in the timing at which information which should be displayed on the second display unit is sent from the first control unit to the second control unit and it realizes the same effectiveness as the first embodiment.

Third Embodiment

Next, a third embodiment of the present invention will be explained. Note that the display apparatus related to the present embodiment has the same outer appearance as the television receiver 100 explained in the first embodiment.

Figure 7:
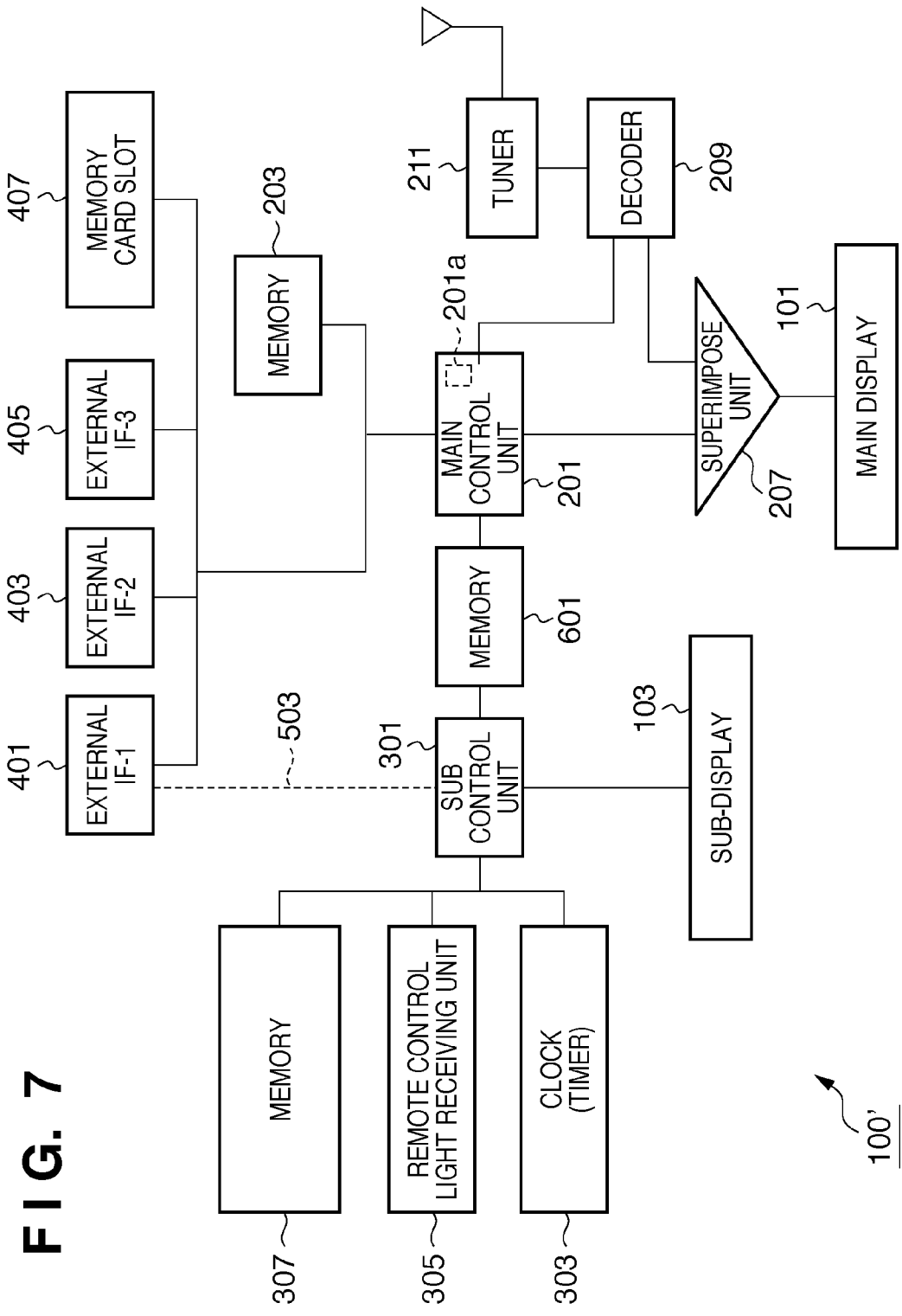
FIG. 7 is a block diagram which depicts an instance of the functional construction of a television receiver 100', according to the third embodiment of the present invention.

FIG. 7 is a block diagram which depicts an instance of the functional organization of a television receiver 100', according to the present embodiment. The same reference numerals used in FIG. 2 to refer to the shared components of the television receiver 100 of the first and second embodiments are used in FIG. 7 and a redundant description will therefore be omitted.

As understood by comparing FIGS. 2 and 7, in the television receiver 100' of the present embodiment, between the main control unit 201 and the sub-control unit 301 a shared memory 601, which is accessible from either side, has been added. Also, a clock (a timer) 303 used to determine whether or not scheduled processing should be executed is connected to the sub-control unit 301.

Further, in the present embodiment the sub-control unit 301 does not power off but continues normal operations even when the television receiver 100' is in the standby state. That is, when performing power-off processing, the sub-control unit 301 only performs processing to send a shutdown request to the main control unit 201.

FIG. 8 depicts an instance of data held in shared memory 601 in a television receiver 100', according to the present embodiment.

Therein, 1001 represents an address of shared memory 601, 1003 represents the data content (data name) held at each address, 1005 represents actual data content values and 1007 represents flag values.

The flag values 1007 define conditions to display on the sub-display 103 of the corresponding data (at least the data value 1005 of the data contents 1003 and the data value 1005). The data contents 1003, the data values 1005 as well as the flag values 1007 are written by the main control unit 201. Further, the main control unit 201 sets each value of the flag values 1007 the for corresponding data based on a flag setting table prepared in advance.

Flag values 1007 may take values "0", "1" or "2"; their meaning is explained below.

The flag value "0" means the corresponding data should not be displayed while the main control unit 201 power is off, but should be displayed when the main control unit 201 power is on.

The flag value "1" means the corresponding data should be displayed at the time when the main control unit 201 changes from power-off to power-on.

The flag value "2" means the corresponding data should be displayed when conditions other than whether the main control unit 201 power is on or is off are fulfilled, such as a predetermined time condition is fulfilled or the like.

Accordingly, in response to power-on of the main control unit 201, "LAST Ch:88" and "LAST Vol:20" (last channel and last volume), which are respectively stored in addresses "1" and "2" of the shared memory 601, are displayed on the sub-display 103.

Further, when the main control unit 201 is powered on, if the time is, for example, 5 minutes before 10:00, the video recording reservation information "Ch77 (10:00):ZZZ", will be displayed on the sub-display 103. However, when the main control unit 201 is powered off, even if the time is 5 minutes before 10:00, the information will not be displayed on the sub-display 103.

Also, if the time is, for example, 5 minutes before 0:00, regardless of the power status of the main control unit 201, the sub-control unit 301 displays the viewing reservation information "Ch88 (0:00-):AAaa" on the sub-display 103.

Flag values and corresponding data classifications are pre-registered in the flag settings table, and when a predetermined event (i.e., in this embodiment, power-off, video recording reservation, and viewing reservation) occurs, the main control unit 201 sets a flag value in accordance with the flag settings table.

For example, at power-off, flag "1" is set to each of the last channel and last volume. Further, in the case of a video recording reservation, flag "0" is set to video recording reservation information. Moreover, in the case of a viewing reservation, flag "2" is set to viewing reservation information.

It goes without saying that the correspondence between these data classifications and flag values is only one example and other combinations may also be used. Further, flags define other data classifications and other display conditions may also be established.

Note that, when the off timer, which powers off the television receiver 100' after a fixed period of time, is set, the main control unit 201 can, at the point in time when the television receiver 100' is powered off based on the off timer, carry out data writing as well as flag setting, as an occurrence of a power-off event.

The sub-control unit 301 periodically (e.g., once per minute) refers to the shared memory 601 and, from the flag values, the power state of the main control unit 201, and the current time indicated by the clock 303, confirms the existence or non-existence of data that should be displayed. Then, if any of such conditions is fulfilled, data should be displayed is retrieved from the shared memory 601 and displayed on the sub-display 103.

The power status of the main control unit 201 may be checked whenever necessary, or between the time a shutdown request is sent and a system start-up completion notice is received, its power status may be determined to be off, or similar methods may optionally be used to determine the power status of the main control unit 201.

Note that when displaying data stored in the shared memory 601, the data need not be displayed as stored, and it may be processed and changed into another format, such as a message format, which is suitable for representing it to a user and then displayed.

In the manner explained above, according to the present embodiment, information that should be displayed on the second display unit is stored in the shared memory which is accessible from both the first and second control units, and the second control unit which controls the second display unit always remains in the power-on state. In this way, even when the first control unit is in the power-off state, a user may be notified of useful information through the second display unit, for example the imminence of a viewing reservation or the like.

Further, because flags as conditions for displaying can be set for each item of information that should be displayed on the second display unit, information can be displayed at an appropriate time depending upon its content and classification.

Fourth Embodiment

Next, a fourth embodiment of the present invention will be explained. Note that the display apparatus related to the present embodiment may have the same outer appearance and functional organization as the television receiver 100' explained in the third embodiment and a redundant description will therefore be omitted.

The television receiver 100' of the present embodiment makes it possible to confirm viewing and video recording reservations using only the sub-display 103 while in the standby state.

To achieve this, as in the third embodiment, in the present embodiment the sub-control unit 301 does not power-off and always remains in operation even when the television receiver 100' is in the standby state.

In the present embodiment, viewing reservation and video recording reservation information (hereinafter, collectively referred to as reservation information) is written to the shared memory 601 by the main control unit 201.

FIG. 9 depicts an instance of reservation information stored in shared memory 601 in a television receiver 100', according to the present embodiment.

Therein, 1201 represents a reservation number, 1202 represents a reservation classification, 1203 represents a reservation day, 1205 represents a reservation start time, 1207 represents a reservation end time, 1209 represents a reservation target channel number, and 1211 represents a reservation target program name.

For example, 000001 is a reservation number 1201 of a video recording reservation with start date and time April 26; 21:00, and end time 21:54. The reservation target channel is 88 and the program name in the given time slot is "AAA Special".

Figure 10:
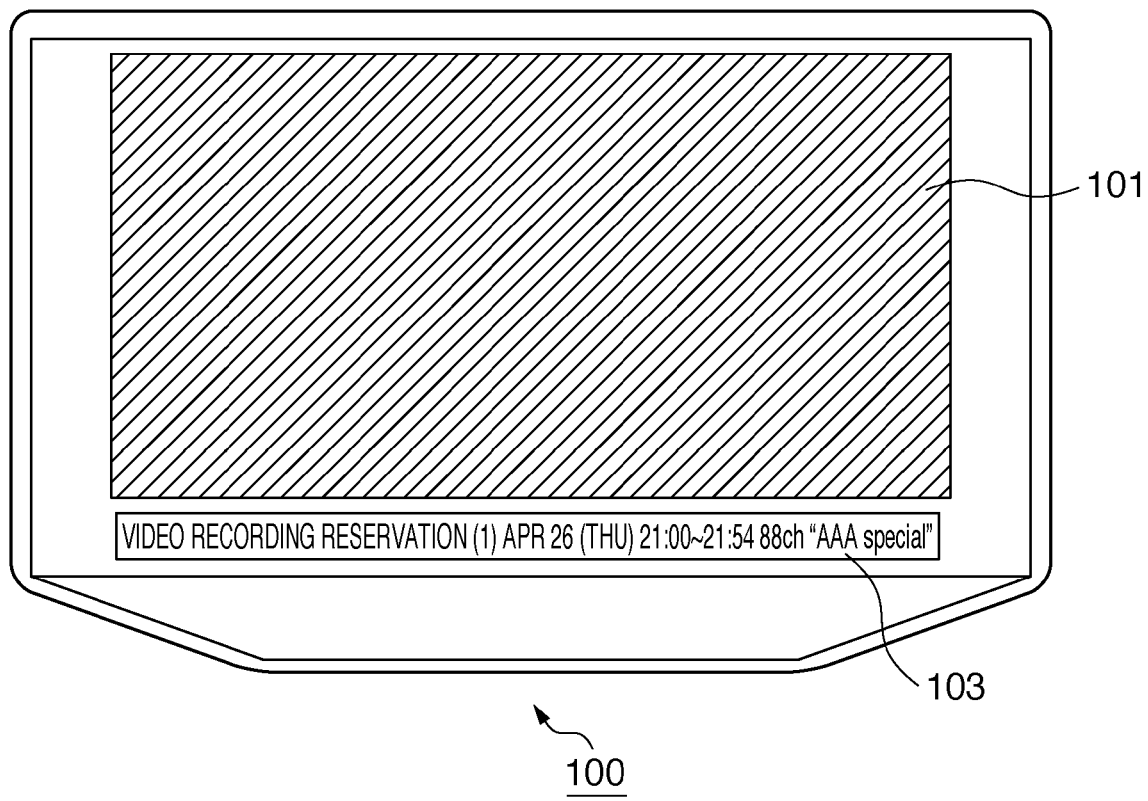
FIG. 10 depicts an instance of display of reservation confirmation on a sub-display 103 in a television receiver 100' in the standby state, according to the fourth embodiment of the present invention.

FIG. 10 depicts an instance of display of reservation confirmation on a sub-display 103 in a television receiver 100' in the standby state, according to the present embodiment.

In the standby state, power to the main control unit 201 and main display 101 is off and nothing is displayed on the main display 101. However, in the present embodiment, as discussed above, in the standby state, the sub-control unit 301 and remote control light receiving unit 305 are in the power-on state and it is possible to detect operation of the remote control (not shown).

Then, for example, when the remote control reservation confirmation button is pressed, the sub-control unit 301 receives, through the remote control light receiving unit 305, a reservation confirmation request. The sub-control unit 301 switches the power to the sub-display 103 to on if it is off, retrieves the reservation information with the oldest reservation number from the shared memory 601 and causes it to be displayed on the sub-display 103.

Also, the sub-control unit 301 changes the reservation information to be displayed on the sub-display 103 in response to remote control operations. For example, in response to operation of the remote control direction (arrow) key, the displayed reservation information can be changed in order.

In this way, according to the present embodiment, it is possible for a user to confirm reservation contents without powering on the television receiver 100', while it is in the standby state. Because of this, a user need not wait for start-up of a television receiver 100' in order to confirm a reservation.

Note that, in the present embodiment, reservation information is stored in the shared memory 601. However, like the television receiver 100 of the first embodiment, the television receiver 100' of the present embodiment may also be organized such that when power to the main control unit 201 is turned off, reservation information is transferred to the sub-control unit 301, and the sub-control unit 301 saves the reservation information to the memory 307. In this case, the data stored in the memory 307 is used for reservation information display and update, and, if reservation information stored in the memory 307 is updated, when the main control unit 201 next starts up notification should be made from the subcontrol unit 301 to the main control unit 201 of the updated reservation information.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions. This application claims the benefit of Japanese Patent Application No. 2007-299835, filed Nov. 19, 2007 which is hereby incorporated by reference herein in its entirety.

What is claimed is:

1. A display apparatus having a first display unit, a second display unit, a first control unit which controls said first display unit, and a second control unit which controls said second display unit, wherein:

said first control unit, in response to an instruction to said display apparatus to enter a standby state from a power-on state, after sending predetermined information that should be displayed on said second display unit to said second control unit, powers itself off, and said second control unit stores the predetermined information that should be displayed on said second display unit, which it received from said first control unit, in a storage unit, and said second control unit, in response to an instruction to said display apparatus to enter the power-on state from the standby state, outputs a power-on request to said first control unit, reads out the predetermined information that should be displayed on said second display unit from said storage unit, and causes the predetermined information to be displayed on said second display unit, and wherein the predetermined information to be displayed on said second display unit is at least one of information regarding a source of the video image being displayed on said first display unit when the instruction to enter the standby state is received and information regarding a volume level when the instruction to enter the standby state is received.

2. The display apparatus according to claim 1, further comprising:

a first memory unit accessible from said first control unit; and a second memory unit accessible from said second control unit, and wherein a start-up time of said second control unit is shorter than that of said first control unit.

3. A display apparatus having a first display unit, a second display unit, a first control unit which controls first display unit, and a second control unit which controls said second display unit, wherein:

said first control unit, in response to an instruction to said display apparatus to enter a standby state from a power-on state, after storing predetermined information that should be displayed on said second display unit to a storage unit, powers itself off;

said second control unit, in response to an instruction to said display apparatus to enter the power-on state from the standby state, sends a power-on request to said first control unit;

in response to the power-on request, said first control unit, before executing start-up processing, reads out the predetermined information that should be displayed on said second display unit from said storage unit, and sends it to said second control unit; and said second control unit causes the predetermined information that should be displayed on said second display unit, which was received from said first control unit, to be displayed on said second display unit, and wherein the predetermined information to be displayed on said second display unit is at least one of information regarding a source of the video image being displayed on said first display unit when the instruction to enter the standby state is received and information regarding a volume level when the instruction to enter the standby state is received.

4. The display apparatus according to claim 3, further comprising:

a first memory unit accessible from said first control unit; and a second memory unit accessible from said second control unit, and wherein a start-up time of said second control unit is shorter than that of said first control unit.

5. A display apparatus having a first display unit, a second display unit, a first control unit which controls said first display unit, and a second control unit which controls said second display unit, wherein:

in a standby state in which said first control unit is in a power-off state and said second control unit is in a power-on state, when said second control unit receives a reservation information confirmation request, said second control unit, without starting up said first control unit, reads out reservation information stored in advance in a storage unit, which is accessible from said second control unit in the standby state, and causes the reservation information to be displayed on said second display unit.

6. The display apparatus according to claim 5, wherein said storage unit, which is accessible from said second control unit in the standby state, is a shared memory accessible from both said first control unit and said second control unit, and the reservation information is written to said shared memory by said first control unit.

7. A control method of a display apparatus having a first display unit, a second display unit, a first control unit which controls said first display unit, a second control unit which controls said second display unit, the method comprising:

a step in which said first control unit, in response to an instruction to said display apparatus to enter a standby state from a power-on state, sending predetermined information that should be displayed on said second display unit to a second control unit, and then powering itself off;

a step in which said second control unit saving the predetermined information that should be displayed on said second display unit, which was received from said first control unit, to a storage unit; and a step in which in response to an instruction to enter the power-on state from the standby state, said second control unit sending a power-on request to said first control unit, reading out the predetermined information that should be displayed on said second display unit, and causing the predetermined information to be displayed on said second display unit, and wherein the predetermined information to be displayed on said second display unit is at least one of information regarding a source of the video image being displayed on said first display unit when the instruction to enter the standby state is received and information regarding a volume level when the instruction to enter the standby state is received.

8. The control method according to claim 7, wherein said display apparatus further comprises:
   a first memory unit accessible from said first control unit; and
   a second memory unit accessible from said second control unit, and
   wherein a start-up time of said second control unit is shorter than that of said first control unit.

9. A control method of a display apparatus having a first display unit, a second display unit, a first control unit which controls said first display unit, a second control unit which controls said second display unit, the method comprising:
   a step in which said first control unit, in response to an instruction to said display apparatus to enter a standby state from a power-on state, saving predetermined information that should be displayed on said second display unit in a storage unit, then powering itself off;
   a step in which said second control unit, in response to an instruction to said display apparatus to enter the power-on state from the standby state, sending a power-on request to said first control unit;
   a step in which said first control unit, in response to the power-on request, before start-up processing, reading out the predetermined information that should be displayed on said second display unit from said storage unit and sending the predetermined information to said second control unit; and
   a step in which said second control unit receiving from said first control unit the predetermined information that should be displayed on said second display unit and causing the predetermined information to be displayed on said second display unit, and
   wherein the predetermined information to be displayed on said second display unit is at least one of information regarding a source of the video image being displayed on said first display unit when the instruction to enter the standby state is received and information regarding a volume level when the instruction to enter the standby state is received.

10. The control method according to claim 9, wherein said display apparatus further comprises:
   a first memory unit accessible from said first control unit; and
   a second memory unit accessible from said second control unit, and
   wherein a start-up time of said second control unit is shorter than that of said first control unit.

11. A control method of a display apparatus having a first display unit, a second display unit, a first control unit which controls said first display unit, a second control unit which controls said second display unit, the method comprising:
   a step in which in a standby state in which said first control unit is in power-off state and said second control unit is in power-on state, when said second control unit receives a reservation information confirmation request, said second control unit, without starting up said first control unit, reading out reservation information stored in advance in a storage unit accessible by said second control unit in the standby state; and
   a step in which said second control unit causing the reservation information to be displayed on said second display unit.

12. The control method according to claim 11, wherein said storage unit, which is accessible from said second control unit in the standby state, is a shared memory accessible from both said first control unit and said second control unit, and the reservation information is written to said shared memory by said first control unit.

* * * * *